United States Patent
Arana et al.

(10) Patent No.: US 10,360,713 B1
(45) Date of Patent: Jul. 23, 2019

(54) EVENT ENHANCEMENT USING AUGMENTED REALITY EFFECTS

(71) Applicant: Disney Enterprises, Inc., Burbank, CA (US)

(72) Inventors: Mark Arana, West Hills, CA (US); Steven M. Chapman, Newbury Park, CA (US); Michael DeValue, Valencia, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/037,805

(22) Filed: Jul. 17, 2018

(51) Int. Cl.
*G06T 11/60* (2006.01)
*G06T 19/00* (2011.01)

(52) U.S. Cl.
CPC ............ *G06T 11/60* (2013.01); *G06T 19/006* (2013.01); *H04N 2201/3256* (2013.01)

(58) Field of Classification Search
None
See application file for complete search history.

(56) References Cited

U.S. PATENT DOCUMENTS

| | | | | |
|---|---|---|---|---|
| 9,201,470 B2* | 12/2015 | Kim | ...................... | G06F 1/1694 |
| 10,181,211 B2* | 1/2019 | Zhong | .................. | B64C 39/024 |
| 2011/0044563 A1* | 2/2011 | Blose | ...................... | G06F 16/58 |
| | | | | 382/306 |
| 2016/0098860 A1* | 4/2016 | Basra | .................... | H04L 67/325 |
| | | | | 345/633 |
| 2016/0125324 A1* | 5/2016 | Yamamoto | ............. | G06Q 30/02 |
| | | | | 705/5 |
| 2017/0061314 A1* | 3/2017 | Schnurr | ........... | H04N 21/23418 |
| 2017/0064240 A1* | 3/2017 | Mangat | .................. | H04N 5/445 |
| 2017/0213389 A1* | 7/2017 | Han | .................... | H04N 5/44591 |
| 2017/0221180 A1* | 8/2017 | Nakashima | ............. | G06F 3/013 |
| 2018/0172452 A1* | 6/2018 | Xu | .......................... | H04W 4/21 |
| 2018/0232056 A1* | 8/2018 | Nigam | .................... | G06F 3/017 |
| 2018/0367835 A1* | 12/2018 | Hamidi-Rad | ...... | H04N 21/4126 |

* cited by examiner

*Primary Examiner* — Jwalant Amin
(74) *Attorney, Agent, or Firm* — Farjami & Farjami LLP

(57) ABSTRACT

There are provided systems and methods for providing event enhancement using augmented reality (AR) effects. In one implementation, such a system includes a computing platform having a hardware processor and a memory storing an AR effect generation software code. The hardware processor is configured to execute the AR effect generation software code to receive a venue description data corresponding to an event venue, to identify the event venue based on the venue description data, and to identify an event scheduled to take place at the event venue. The hardware processor is further configured to execute the AR effect generation software code to generate one or more AR enhancement effect(s) based on the event and the event venue, and to output the AR enhancement effect(s) for rendering on a display of a wearable AR device during the event.

20 Claims, 5 Drawing Sheets

EVENT ENHANCEMENT USING AUGMENTED REALITY EFFECTS

BACKGROUND

One of the advantages of viewing sports, for example, from home is enjoyment of the special effects and customized viewing perspectives often provided as a supplement to the sports content. For instance, a network broadcaster of a sporting competition may include visual highlights in their broadcast feed, such as "red zone" or "first down" visual effects during a football game, or a visual feature showing the limits of the strike zone during a baseball at bat. Nevertheless, and despite the additional enjoyment provided by these supplemental features available to a viewer at home, they cannot replicate the immersiveness and immediacy of experiencing a sporting competition in person.

Attending a sporting match in person transforms the experience from one of largely passive media consumption to an engaging "event." However, presence at a sporting venue can impose its own constraints on enjoyment of the event. For example, the viewing perspectives from some seats in a stadium are more advantageous for following the action than others. Moreover, some seats may have a field-of-view that is partially obstructed by structural features of an arena or stadium, or may be located relatively far from the field of competition. Unfortunately, analogous constraints can limit the enjoyment of attending a movie, stage play, or music concert.

SUMMARY

There are provided systems and methods for providing event enhancement using augmented reality effects, substantially as shown in and/or described in connection with at least one of the figures, and as set forth more completely in the claims.

DETAILED DESCRIPTION

Figure 1:
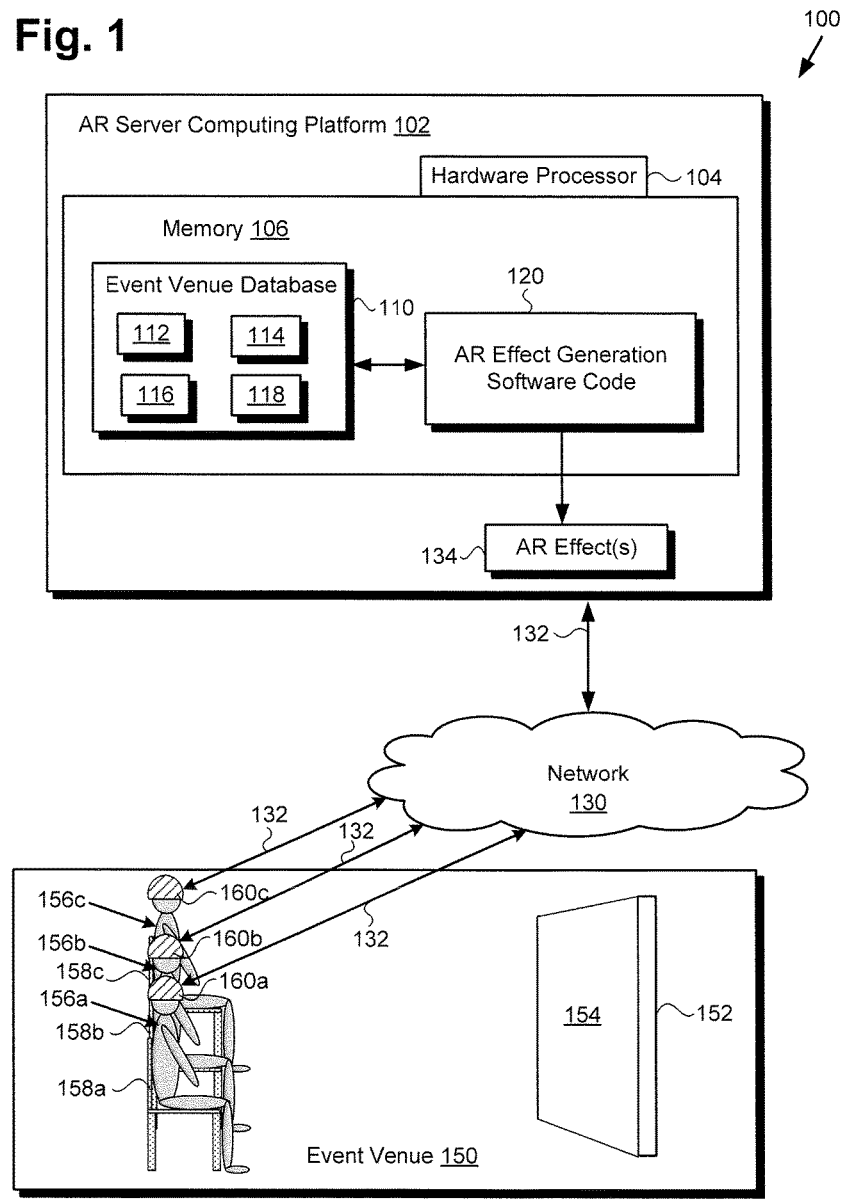
FIG. 1 shows a diagram of an exemplary system for providing event enhancement using augmented reality (AR) effects, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing event enhancement using augmented reality (AR) effects. It is noted that, as used herein, "augmented reality" or "AR" refers to the merging of one or more real-world object images and one or more virtual images, and may be incorporated as part of an AR user experience or a virtual reality (VR) user experience. Moreover, "AR enhancement effect" refers to one or more virtual images in the form of text, such as subtitles, environmental features, such as lighting, color, or structural/architectural features of an event venue, or simulations of persons, avatars, characters, caricatures of a person, animals, plants, and living things of various species or varieties, as well as inanimate objects.

FIG. 1 shows a diagram of an exemplary system for providing event enhancement using AR effects, according to one implementation. As shown in FIG. 1, system 100 can include AR server computing platform 102 having hardware processor 104, memory 106 implemented as a non-transitory storage device storing AR effect generation software code 120 and event venue database 110 including data corresponding to multiple event venue types, such as exemplary cinemas 112, theaters 114, stadiums/arenas 116, and parks 118. It is noted that, as also shown in FIG. 1, AR effect generation software code 120, when executed by hardware processor 104, is configured to generate AR enhancement effect or effects 134 (hereinafter "AR enhancement effect(s) 134").

As further shown in FIG. 1, system 100 is implemented within a use environment including communication network 130 and one or more wearable AR devices 160a, 160b, and/or 160c (hereinafter "wearable AR devices 160a-160c"). As described in greater detail below by reference to FIGS. 2A, 2B, and 3, each of wearable AR devices 160a-160c includes at least a hardware processor, a memory, a transceiver, a display, and a camera. In addition, and as shown in FIG. 1, wearable AR devices 160a-160c are utilized by respective one or more attendees 156a, 156b, and/or 156c to event 154 (hereinafter "user(s) 156a, 156b, and/or 156c") at event venue 150. Also shown in FIG. 1 are network communication links 132 interactively connecting wearable AR devices 160a-160c and system 100 via communication network 130, exemplary movie screen 152 providing event 154 in the form of a cinematic film, and seats 158a, 158b, and/or 158c (hereinafter "seat(s) 158a, 158b, and/or 158c") occupied by respective user(s) 156a, 156b, and/or 156c.

It is noted that, although the present application refers to AR effect generation software code 120 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of AR server computing platform 102, or to a hardware processor of any of wearable AR devices 160a-160c. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1 depicts AR effect generation software code 120 and event venue database 110 as being co-located in memory 106, that representation is also provided merely as an aid to conceptual clarity. More generally, system 100 may include one or more computing platforms 102, such as computer servers for example, which may form an interactively linked but distributed system, such as a cloud based system, for instance. As a result, hardware processor 104 and memory 106 may correspond to distributed processor and memory resources within system 100.

According to the implementation shown by FIG. 1, user(s) 156a, 156b, and/or 156c may utilize respective wearable AR devices 160a-160c to enjoy AR enhancement effect(s) 134 for event 154 during event 154. In one such implementation, system 100 may correspond to one or more web servers, accessible over a packet-switched network such as the Internet, for example. Alternatively, system 100 may correspond to one or more computer servers supporting a local area network (LAN), or included in another type of limited distribution network.

In some implementations, event venue 150 may take the form of an indoor venue. Examples of such indoor venues include a cinema, a theater, a concert hall, or an enclosed sports arena, to name a few. Alternatively, in some implementations, event venue 150 may take the form of an outdoor venue. Examples of such outdoor venues include an open air sports arena or stadium, a resort property, and a park, again to name merely a few.

Figure 2A:
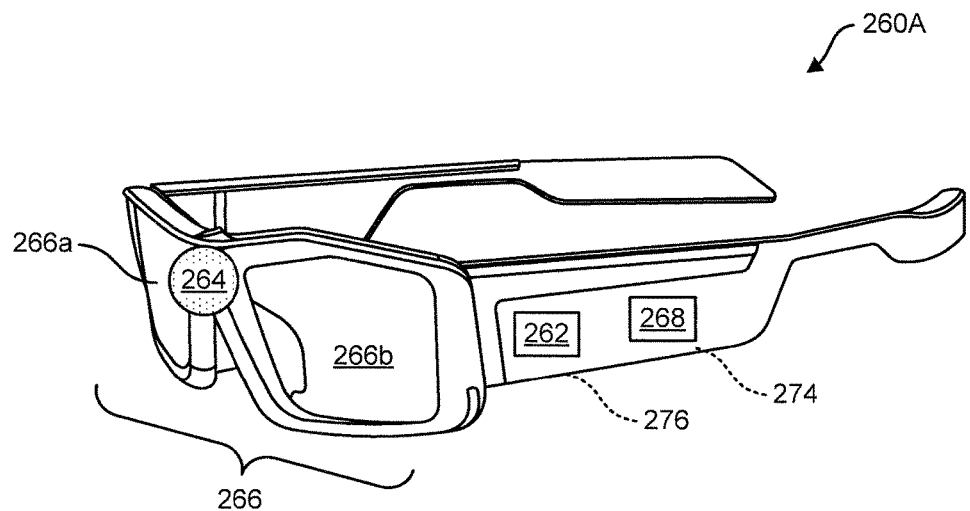
FIG. 2A shows an exemplary wearable AR device suitable for use in conjunction with the system of FIG. 1, according to one implementation.
Figure 2B:
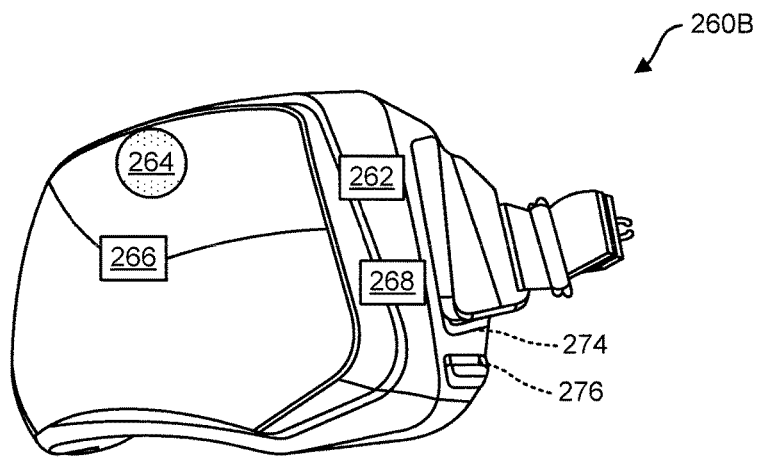
FIG. 2B shows an exemplary wearable AR device suitable for use in conjunction with the system of FIG. 1, according to another implementation.

Referring to FIGS. 2A and 2B, those figures show specific exemplary implementations of a wearable AR device suitable for use in conjunction with the system of FIG. 1. As shown by FIGS. 2A and 2B, respective wearable AR devices 260A and 260B can take a variety of forms. For example, and as shown by FIG. 2A, wearable AR device 260A may be implemented as AR glasses. As further shown by FIG. 2B, in some implementations, wearable AR device 260B may take the form of AR goggles. Moreover, in other implementations, a wearable AR device may take the form of an AR headset.

Each of wearable AR devices 260A and 260B includes transceiver 262, camera 264, and display 266 under the control of hardware processor 274. In addition, each of wearable AR devices 260A and 260B includes memory 276 implemented as a non-transitory storage device, and may further include one or more position/location sensor(s) 268. Either of wearable AR devices 260A and 260B can correspond in general to any of wearable AR device(s) 160a-160c, in FIG. 1. Thus, wearable AR device(s) 160a-160c may share any of the characteristics attributed to any of wearable AR devices 260A and 260B, and vice versa. That is to say, although not shown in FIG. 1, each of wearable AR device(s) 160a-160c include features corresponding respectively to transceiver 262, camera 264, display 266, hardware processor 274, and memory 276, and may further include a feature or features corresponding to position/location sensor(s) 268.

Transceiver 262 may be implemented as a wireless communication unit enabling wearable AR devices 160a-160c/260A/260B to exchange data with system 100, in FIG. 1, via communication network 130 and network communication links 132. For example, transceiver 262 may be implemented as a 4G wireless transceiver, or as a 5G wireless transceiver configured to satisfy the IMT-2020 requirements established by the International Telecommunication Union (ITU).

Camera 264 may include a still image camera and/or a video camera. Moreover, in some implementations, camera 264 may correspond to an array of still image and/or video cameras configured to generate a panoramic image of an event venue, such as event venue 150.

As shown in FIGS. 2A and 2B, display 266 may take the form of a single display screen, i.e., see FIG. 2B, or multiple display screens, i.e., display screens 266a and 266b in FIG. 2A. Display 266 including one or more display screens may be implemented as a liquid crystal display (LCD), a light-emitting diode (LED) display, an organic light-emitting diode (OLED) display, or another suitable display screen that performs a physical transformation of signals to light.

Position/location sensor(s) 268 may include one or more accelerometers, and/or gyroscopes, and/or a GPS receiver, and/or a magnetometer, for example. In some implementations, position/location sensor(s) 268 may be implemented as an inertial measurement unit (IMU), as known in the art.

Figure 3:
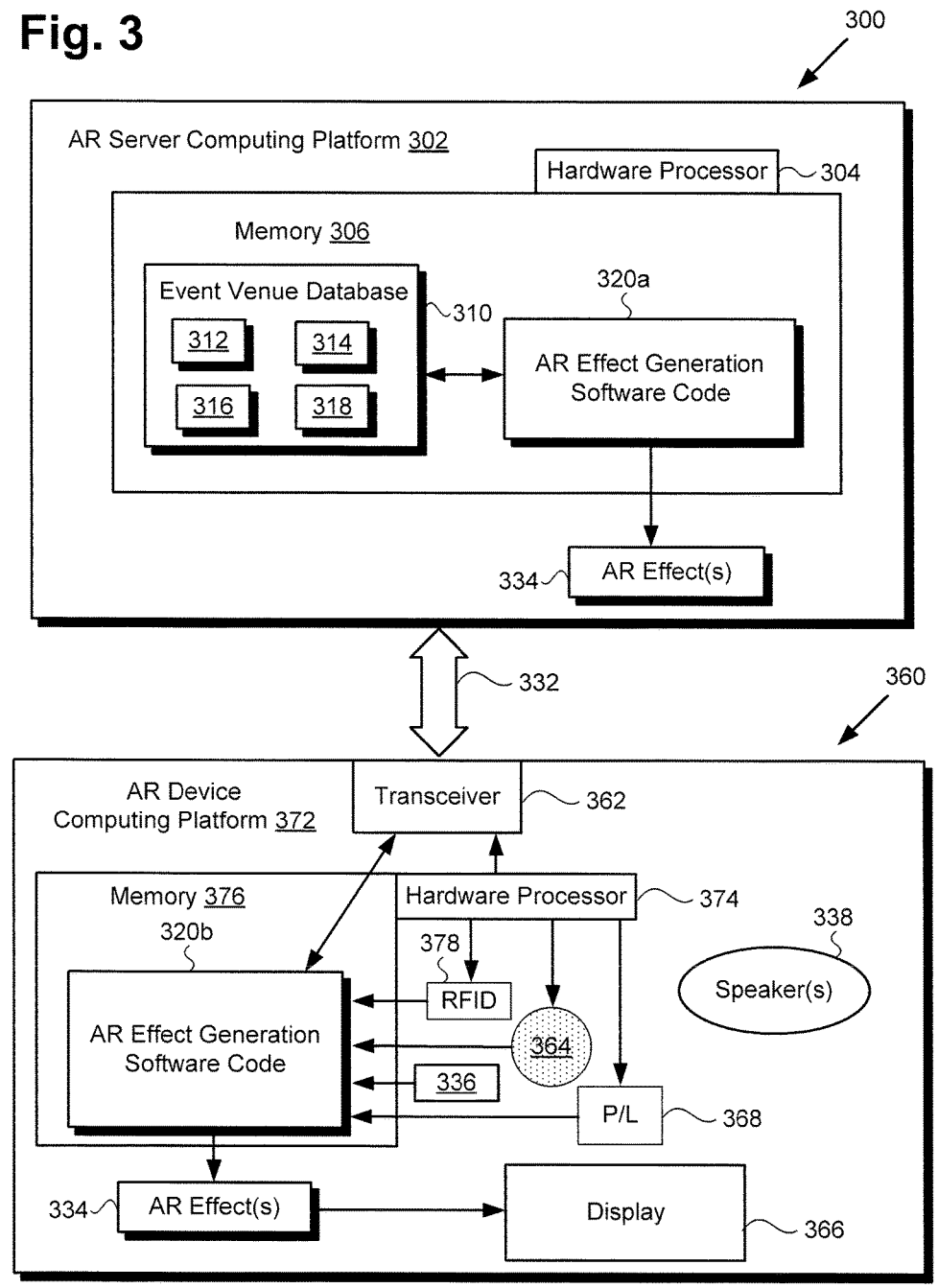
FIG. 3 shows another exemplary implementation of a system for providing event enhancement using AR effects.

FIG. 3 shows another exemplary implementation of a system for providing event enhancement using AR effects. According to the exemplary implementation shown in FIG. 3, wearable AR device 360 is interactively connected to system 300 over network communication link 332.

As shown in FIG. 3, wearable AR device 360 includes transceiver 362, camera 364, display 366, and position/location sensor(s) 368 corresponding respectively in general to transceiver 262, camera 264, display 266, and position/location sensor(s) 268, in FIGS. 2A and 2B. In other words, transceiver 362, camera 364, display 366, and position/location sensor(s) 368 may share any of the characteristics attributed to transceiver 262, camera 264, display 266, and position/location sensor(s) 268 by the present disclosure, and vice versa.

In addition, wearable AR device 360 includes AR device computing platform 372 having hardware processor 374 and memory 376 corresponding respectively in general to hardware processor 274 and memory 276 in FIGS. 2A and 2B. Thus, hardware processor 374 and memory 376 may share any of the characteristics attributed to hardware processor 274 and memory 276 by the present disclosure, and vice versa. Also shown in FIG. 3 are optional acoustic sensor or sensors 336 (hereinafter "acoustic sensor(s) 336"), one or more speakers 338 (hereinafter "speaker(s) 338"), radio-frequency identification (RFID) reader 378, and one or more AR enhancement effect(s) 334 generated by system 300 or by wearable AR device 160a-160c/260A/260B/360. Wearable AR device 360 can correspond in general to any of wearable AR device(s) 160a-160c/260A/260B, in FIGS. 1, 2A, and 2B. Thus, wearable AR device(s) 160a-160c/260A/260B may share any of the characteristics attributed to wearable AR devices 360, and vice versa. That is to say, in addition to the features attributed to wearable AR device(s) 160a-160c/260A/260B above, each of wearable AR device(s) 160a-160c/260A/260B may include features corresponding respectively to acoustic sensor(s) 336, speaker(s) 338, and/or RFID reader 378.

Network communication link 332, and system 300 including AR server computing platform 302 having hardware processor 304 and memory 306 correspond in general to network communication link 122, and AR server computing platform 102 having hardware processor 104 and memory 106, in FIG. 1. Moreover, AR effect generation software code 320*a*, and event venue database 310 including data corresponding to event venues such as cinemas 312, theaters 314, stadiums/arenas 316, and parks 318, in FIG. 3, correspond respectively to AR effect generation software code 120, and event venue database 110 including data corresponding to cinemas 112, theaters 114, stadiums/arenas 116, and parks 118, in FIG. 1. Thus, event venue database 310 and AR effect generation software code 320*a* may share any of the characteristics attributed to event venue database 110 and AR effect generation software code 120 by the present disclosure, and vice versa.

According to the exemplary implementation shown in FIG. 3, AR effect generation software code 320*b* is located in memory 276/376 of wearable AR device 160*a*-160*c*/260A/260B/360, having been received from system 100/300 via network communication link(s) 132/332. In one implementation, network communication link(s) 132/332 corresponds to transfer of AR effect generation software code 320*b* over a packet network, for example. Once transferred, for instance by being downloaded over network communication link(s) 132/332, AR effect generation software code 320*b* may be persistently stored in memory 276/376 and may be executed locally on wearable AR device 360 by hardware processor 274/374.

Hardware processor 274/374 may be the central processing unit (CPU) for wearable AR device 160*a*-160*c*/260A/260B/360, for example, in which role hardware processor 274/374 runs the operating system for wearable AR device 160*a*-160*c*/260A/260B/360 and executes AR effect generation software code 320*b*. AR effect generation software code 320*b* corresponds in general to AR effect generation software code 120/320*a*, and when executed by hardware processor 274/374, is capable of performing all of the operations attributed to AR effect generation software code 120/320*a* by the present disclosure. Thus, in some implementations, wearable AR device 160*a*-160*c*/260A/260B/360 may itself be integrated with a system for providing event enhancement using AR effects. In the exemplary implementation of FIG. 3, a user, such as any of user(s) 156*a*, 156*b*, and/or 156*c* can utilize wearable AR device 160*a*-160*c*/260A/260B/360 to generate AR enhancement effect(s) 134/334 for event 154 during event 154, and/or to enjoy AR enhancement effect(s) 134/334 for event 154 that are generated by system 100/300.

Figure 4:
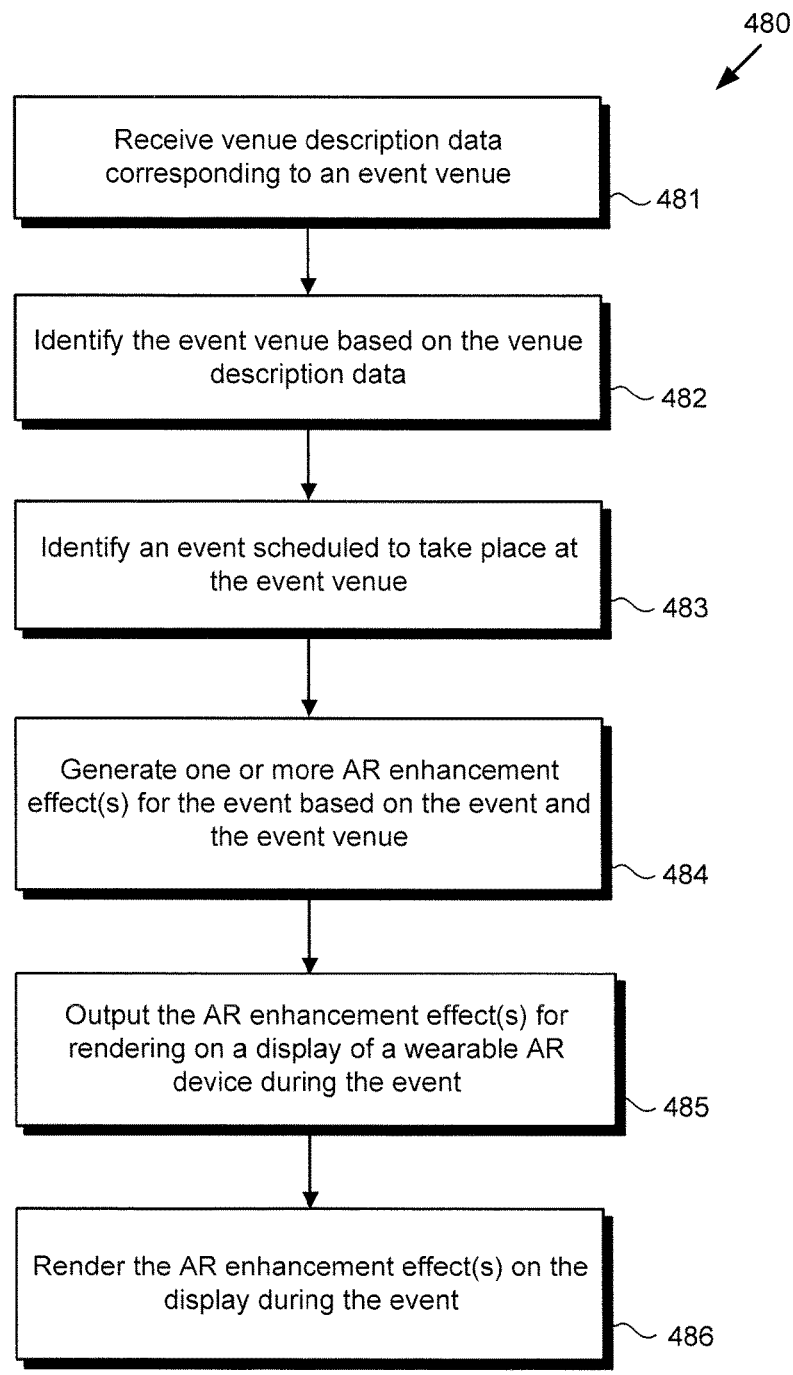
FIG. 4 is a flowchart presenting an exemplary method for use by a system to provide event enhancement using AR effects.

The functionality of AR effect generation software code 120/320*a*/320*b* will be further described by reference to FIG. 4 in combination with FIGS. 1, 2A, 2B, 3, and 5. FIG. 4 shows flowchart 480 presenting an exemplary method for use by a system to for provide event enhancement using AR effects. With respect to the method outlined in FIG. 4, it is noted that certain details and features have been left out of flowchart 480 in order not to obscure the discussion of the inventive features in the present application.

Figure 5:
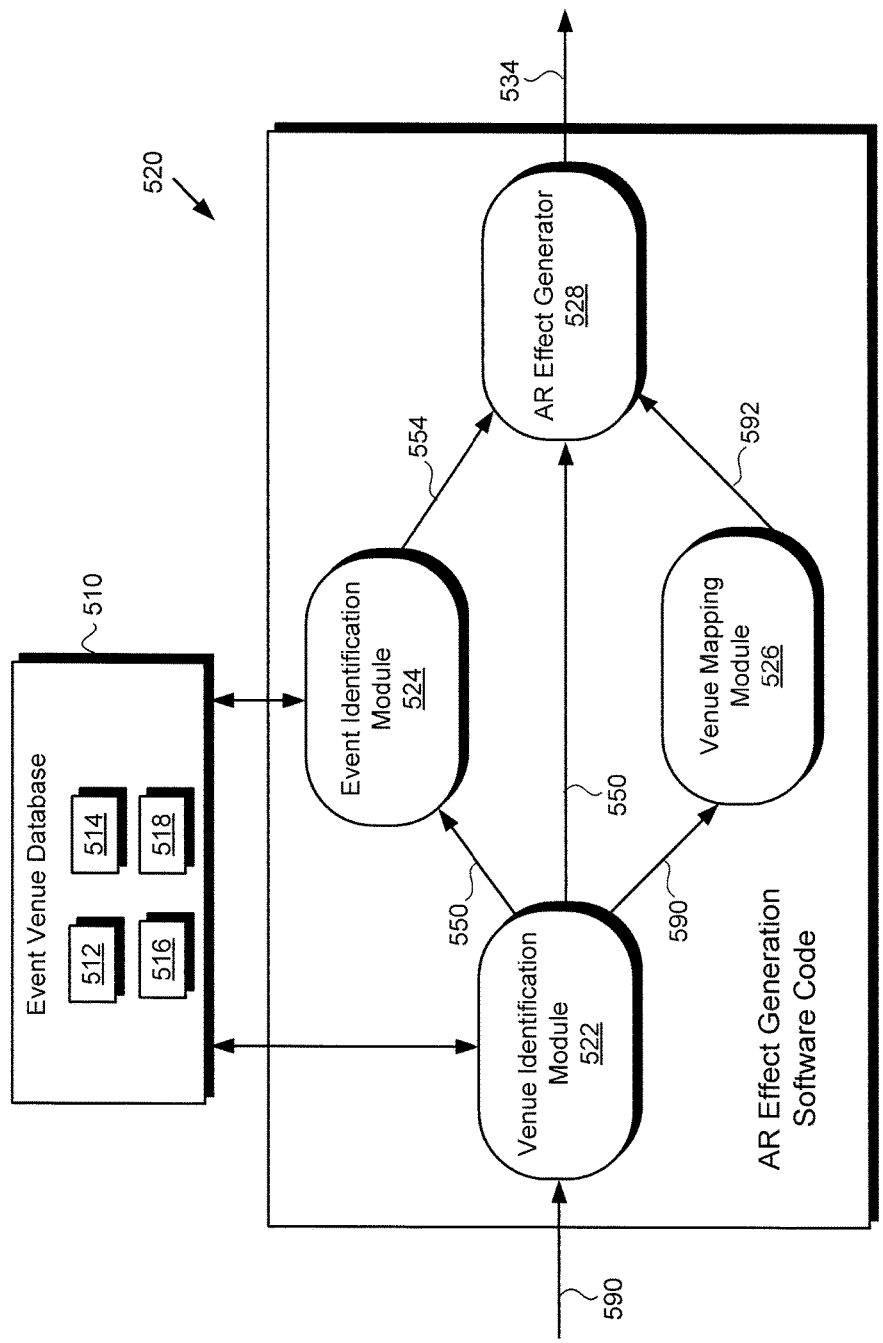
FIG. 5 shows an exemplary diagram of an AR effect generation software code suitable for execution by a hardware processor to provide event enhancement using AR effects, according to one implementation.

FIG. 5 shows an exemplary diagram of AR effect generation software code 520 suitable for execution by a hardware processor of the systems shown by FIGS. 1, 2A, 2B, and 3, according to one implementation. As shown in FIG. 5, AR effect generation software code 520 may include venue identification module 522, event identification module 524, venue mapping module 526, and AR effect generator 528. In addition, FIG. 5 shows venue description data 590, event venue 550, event 554, venue map 592, and AR enhancement effect(s) 534. Also shown in FIG. 5 is event venue database 510 including data corresponding to event venues such as cinemas 512, theaters 514, stadiums/arenas 516, and parks 518.

AR enhancement effect(s) 534 and event venue database 510 correspond respectively in general to AR enhancement effect(s) 134/334 and event venue database 110/310, in FIGS. 1 and 3, and may share any of the characteristics attributed to those corresponding features by the present disclosure. Moreover, AR effect generation software code 520 corresponds in general to AR effect generation software code 120/320*a*/320*b*, in FIGS. 1 and 3. That is to say, like AR effect generation software code 520, AR effect generation software code 120/320*a*/320*b* may include modules corresponding to venue identification module 522, event identification module 524, venue mapping module 526, and AR effect generator 528.

In addition, event venue 550 and event 554 correspond respectively in general to event venue 150 and event 154, in FIG. 1. Consequently, event venue 550 and event 554 may share any of the characteristics attributed to event venue 150 and event 154 by the present disclosure, and vice versa. It is noted that in implementations in which AR effect generation software code 320*b*/520 is stored on memory 276/376 of wearable AR device 160*a*-160*c*/260A/260B/360 and executed locally by hardware processor 274/374, event venue database 110/310/510 may be accessible to AR effect generation software code 320*b*/520 via communication network 130 and network communication link(s) 132/332.

Referring to FIG. 4 in combination with FIGS. 1, 2A, 2B, 3, and 5, flowchart 480 begins with receiving venue description data 590 corresponding to event venue 150/550 (action 481). As noted above, wearable AR device 160*a*-160*c*/260A/260B/360 may include camera 264/364 corresponding to one or more still image and/or video cameras. Thus, in some implementations, venue description data 590 may include image data obtained using camera 264/364 at event venue 150/550. Alternatively, or in addition, in some implementations, wearable AR device 160*a*-160*c*/260A/260B/360 may include acoustic sensors(s) 336 and speaker(s) 338. In those implementations, venue description data 590 may include acoustic data in lieu of, or in combination with, image data.

In some implementations, venue description data 590 may be obtained using wearable AR device 160*a*-160*c*/260A/260B/360, and may be subsequently transmitted to system 100/300 via communication network 130 and network communication link(s) 132/332. In those implementations venue description data 590 may be received from wearable AR device 160*a*-160*c*/260A/260B/360 by AR effect generation software code 120/320*a*/520, executed by hardware processor 104/304. Alternatively, and as also noted above, in some implementations, AR effect generation software code 320*b*/520 may be stored locally on memory 276/376 of wearable AR device 160*a*-160*c*/260A/260B/360. In those implementations, venue description data 590 may be received from camera 264/364 of wearable AR device 160*a*-160*c*/260A/260B/360, for example, by AR effect generation software code 320*b*/520, executed by hardware processor 274/374.

Flowchart 480 continues with identifying event venue 150/550 based on venue description data 590 (action 482). Identification of event venue 150/550 may be performed in any one or more of several different ways. In some implementations, event venue 150/550 may include one or more distinctive physical features that are identifiable by reference to event venue database 110/310/510. As a specific example, where event venue 150/550 is a cinema, movie screen 152 providing event 154/554 may have distinctive dimensions and/or other display features that can be identified by reference to data corresponding to cinemas 112/312/512 and accessible on event venue database 110/310/510.

Alternatively, an entry ticket for event 154/554 may include an event venue identifying code, such as an alphanumeric code, or Quick Response Code (QR Code™) or other matrix based code identifying event venue 150/550. Where an entry ticket for event 154/554 includes an event venue identifying code, that code can be obtained by being captured or scanned using features of wearable AR device 160a-160c/260A/260B/360 and may be included in venue description data 590. It is noted that, in some implementations, a QR Code™ or other matrix based code may be utilized to activate AR device 160a-160c/260A/260B/360 in event venue 150/250.

In some implementations, identifying event venue 150/550 in action 482 may include calibrating wearable AR device 160a-160c/260A/260B/360 to approximate the viewing distortion experienced by a user of the wearable AR device. The approximation may be based on a parallax of the viewing angle of the user, for example. In implementations in which event venue 150/550 is a cinema, for instance, a calibration screen may be shown on movie screen 152 prior to the beginning of event 154/554. Such a calibration screen may show a theme park castle or other landmark, or may include watermarks on the corners of movie screen 152, which may be captured by camera 264/364 and be included in venue description data 590.

In other implementations, calibration of wearable AR device 160a-160c/260A/260B/360 may be based on acoustic data gathered by acoustic sensor(s) 336. In those implementations, speaker(s) 338 may be utilized for the calibration.

As noted above, in some implementations, venue description data 590 may be received from wearable AR device 160a-160c/260A/260B/360 by system 100/300. In those implementations, event venue 150/550 may be identified by AR effect generation software code 120/320a/520, executed by hardware processor 104/304, and using venue identification module 522. Alternatively, and as also noted above, in some implementations, AR effect generation software code 320b/520 may be stored locally on memory 276/376 of wearable AR device 160a-160c/260A/260B/360. Thus, in some implementations, event venue 150/550 may be identified by AR effect generation software code 320b/520, executed by hardware processor 274/374, and using venue identification module 522.

Although not included in the exemplary outline provided by flowchart 480, in some implementations, the present method may include producing venue map 592 of event venue 150/550 based on image data included in venue description data 590. Alternatively, or in addition, mapping of event venue 150/550 may be performed using an RFID tag or QR Code™ identifying a seat, e.g., one of seats 158a, 158b, and/or 158c, in event venue 150/550. Mapping of event venue 150/550, for example, identification of a specific seat in event venue 150/550, in combination with a seating plan for event venue 150/550 accessible on event venue database 110/310, may further enable calibration of wearable AR device 160a-160c/260A/260B/360 to approximate the viewing distortion experienced by the user of the wearable AR device.

In some implementations, mapping of event venue 150/550 may be performed by AR effect generation software code 120/320a/520, executed by hardware processor 104/304, and using venue mapping module 526 to produce venue map 592 based on an RFID tag read using RFID reader 378, or based on a QR Code™ or other matrix based code captured or scanned using features of wearable AR device 160a-160c/260A/260B/360. Alternatively, in some implementations, mapping of event venue 150/550 may be performed by AR effect generation software code 320b/520, executed by hardware processor 274/374, and using venue mapping module 526 to produce venue map 592 based on an RFID tag data or a QR Code™ or other matrix based received from wearable AR device 160a-160c/260A/260B/360 via communication network 130.

Flowchart 480 continues with identifying event 154/554 scheduled to take place at event venue 150/550 (action 483). Identification of event 154/554 may be performed in any one or more of several different ways. In some implementations event venue database 110/310/510 may include scheduling information for events to be held at various venues. As a specific example, where event venue 150/550 is a cinema, data corresponding to cinemas 112/312/512 and accessible on event venue database 110/310/510 may include date and time schedules for films to be shown on movie screen 152. In those instances, identification of event 154/554 may be performed based on the present date and time.

Alternatively, an entry ticket for event 154/554 may include an event identifying code, such as an alphanumeric code, or QR Code™ or other matrix based code identifying event 154/554. Where an entry ticket for event 154/554 includes an event identifying code, that code can be obtained by being captured or scanned using features of wearable AR device 160a-160c/260A/260B/360.

In implementations in which an event identifying code is obtained by wearable AR device 160a-160c/260A/260B/360 and transmitted to system 100/300, event 154/554 may be identified by AR effect generation software code 120/320a/520, executed by hardware processor 104/304, and using event identification module 524. Alternatively, event 154/554 may be identified by AR effect generation software code 320b/520, executed by hardware processor 274/374 of wearable AR device 160a-160c/260A/260B/360, and using event identification module 524.

Flowchart 480 continues with generating AR enhancement effect(s) 134/334/534 based on event 154/554 and event venue 150/550 (action 484). AR enhancement effect(s) 134/334/534 may take many different forms, depending on the type of event 154/554 and the nature of event venue 150/550. For example, in cases where event 154/554 is a screening of a cinematic film, an opera performance, or an enactment of a play, AR enhancement effect(s) 134/334/534 may take the form of subtitles for event 154/554. Moreover, such subtitles may be generated in the native language, or a preferred language, of a user of wearable AR device 160a-160c/260A/260B/360.

Where AR enhancement effect(s) 134/334/534 take the form of subtitles, those subtitles may be in a different language for each of user(s) 156a, 156b, and/or 156c. Furthermore, where one or more of user(s) 156a, 156b, and/or 156c suffers from a hearing impairment, AR enhancement effect(s) 134/334/534 may incorporate sign language. In various implementations, AR enhancement effect(s) 134/334/534 may be generated as subtitles for event 154/554 during which subtitles are not shown on movie screen 152, or may overlay subtitles appearing on screen 152 in a different language.

A noted above, in some implementations, camera 264/364 of wearable AR device 160a-160c/260A/260B/360 can be used to detect the dimensions of movie screen 152, and as a user of wearable AR device 160a-160c/260A/260B/360 moves his/her head, wearable AR device 160a-160c/260A/260B/360 may be configured to keep subtitle text aligned with the location of movie screen 152 relative to the user's posture or orientation. Moreover, in some implementations, subtitles may be turned off if the user moves his/her head into a position where viewing of movie screen 152 is impractical or obstructed.

In some implementations, AR enhancement effect(s) 134/334/534 may include metadata specifying a location on display 266/366 for placement of AR enhancement effect(s) 134/334/534. In some of those implementations, the location on display 266/366 for placement of AR enhancement effect(s) 134/334/534 may be selected by one of users 156a, 156b, and/or 156c, while in other implementations, location determination may be made by a producer or owner of event 150/550. For example, in one implementation, subtitle indicators may be encoded or embedded into a video signal to identify where movie screen 152 is located relative to the user of wearable AR device 160a-160c/260A/260B/360. In some implementations, subtitle generation and placement may also be based on the color contrasting and/or lighting of a scene displayed as part of event 154/554.

Alternatively, or in addition, AR enhancement effect(s) 134/334/534 may include images and/or text identifying actors, musical artists, or other performers involved in event 154/554, the characters those actors or performers portray, or additional information about event 154/554, such as its history, or critical reviews, for example. In one implementation, such images and/or text may include one or more of a word bubble, thought bubble, and information bubble corresponding to at least one of an actor, character, or musical artist performing in event 154/554, like text bubbles popping up next to characters in a batman movie, or lyrics of a song being displayed during a play performance while the actor is performing the song, etc. In yet another implementation, AR enhancement effect(s) 134/334/534 may include images superimposed on real elements during a live performance or a sports game, such as superimposing a virtual ten-yard line on a real football field being viewed through the AR glass at a football stadium.

As another example, in cases where event 154/554 is a sporting event, AR enhancement effect(s) 134/334/534 may take the form of images or text providing play-by-play analysis of event 154/554. Moreover, the text may be generated in the native language, or a preferred language, of a user of wearable AR device 160a-160c/260A/260B/360. Alternatively, or in addition, AR enhancement effect(s) 134/334/534 may include images and/or text identifying athletes or other notable persons involved in event 154/554, or additional information about event 154/554, such as game statistics, for example. In one implementation, such images and/or text may include one or more of a word bubble, thought bubble, and information bubble corresponding to an athlete performing in event 154/554.

As another specific example, when event 154/554 is a baseball game, AR enhancement effect(s) 134/334/534 may include a pitch count and/or visual effects showing the strike zone or trajectory of a ball hit into play, for instance. As another specific example, when event 154/554 is a football game, AR enhancement effect(s) 134/334/534 may include visual effects showing a first down line, or the trajectory of a forward pass or field goal attempt, for instance.

As noted above, in some implementations, the present method may include producing venue map 592 of event venue 150/550. As also noted above, mapping of event venue 150/550 may further enable calibration of wearable AR device 160a-160c/260A/260B/360 to approximate the viewing distortion experienced by the user of the wearable AR device. For example, where event venue 150/550 is mapped and seat 158a, 158b, or 158c occupied by respective user 156a, 156b, or 156c is identified, AR enhancement effect(s) 134/334/534 may include displaying a viewing angle of event 154/554 corresponding to a location of the respective seat occupied by the user.

In some implementations, system 100/300 or wearable AR device 160a-160c/260A/260B/360 may be configured to utilize position/location sensor(s) 268/368, camera 264/364, and/or RFID reader 378 of wearable AR device 160a-160c/260A/260B/360 to identify a location of wearable AR device 160a-160c/260A/260B/360 in event venue 150/550. In addition, or alternatively, AR device 160a-160c/260A/260B/360 may be configured to utilize one or more of those features to detect movement of a user of wearable AR device 160a-160c/260A/260B/360 away from a seat recently occupied by the user.

In implementations in which system 100/300 or wearable AR device 160a-160c/260A/260B/360 is configured to detect relocation of the user to another seat in event venue 150/550, AR enhancement effect(s) 134/334/534 may include displaying another viewing angle of event 154/554 corresponding to a location of the seat newly occupied by the user. In some implementations, relocation by a user may correspond to a first user merely leaning over to speak with a second user occupying an adjacent seat, which may be determined using user's head tracking. In those implementations, the viewing angle displayed to the first user could be temporarily changed to the viewing angle corresponding to the adjacent seat as long as the first user is leaning over.

In some implementations, AR enhancement effect(s) 134/334/534 may preserve the viewing angle of event 154/554 available from the recently occupied seat. As a specific example, where event venue 150/550 is a stadium or sports arena and a user of wearable AR device 160a-160c/260A/260B/360 leaves his/her seat to use the men's/ladies' room or to visit a concession, AR enhancement effect(s) 134/334/534 may include a picture-in-picture visual effect locked to a viewing angle of the user's temporarily abandoned seat so as to enable the user to continue to view event 154/554 from the same perspective as though occupying his/her seat in event venue 150/250.

According to some implementations, AR enhancement effect(s) 134/334/534 may be generated by AR effect generation software code 120/320a/520, executed by hardware processor 104/304, and using AR effect generator 528. Alternatively AR enhancement effect(s) 134/334/534 may be generated by AR effect generation software code 320b/520, executed by hardware processor 274/374 of wearable AR device 160a-160c/260A/260B/360, and using event AR effect generator 528.

Flowchart 480 may continue with outputting AR enhancement effect(s) 134/334/534 for rendering on display 266/366 of wearable AR device 160a-160c/260A/260B/360 during event 154/554 (action 485). In some implementations, outputting of AR enhancement effect(s) 134/334/534 for rendering on display 266/366 during event 154/554 may be performed by AR effect generation software code 120/320a/520, executed by hardware processor 104/304. For example, in those implementations, AR enhancement effect(s) 134/334/534 generated by system 100/300 in action 484 may be transmitted to wearable AR device 160a-160c/260A/260B/360 via communication network 130 and network communication link(s) 132/332 during event 154/554. Alternatively, outputting of AR enhancement effect(s) 134/334/534 for rendering on display 266/366 during event 154/554 may be performed by AR effect generation software code 320b/520, executed by hardware processor 274/374 of wearable AR device 160a-160c/260A/260B/360.

Exemplary flowchart 480 may conclude with rendering one or more AR enhancement effect(s) 134/334/534 on display 266/366 of wearable AR device 160a-160c/260A/ 260B/360 during event 154/554 (action 486). As noted above in some implementations, AR enhancement effect(s) 134/334/534 may include metadata specifying a location on display 266/366 for placement of AR enhancement effect(s) 134/334/534. For example, where AR enhancement effect(s) 134/334/534 take the form of subtitles, information, or statistics, AR enhancement effect(s) 134/334/534 may include metadata specifying that the subtitles, information, or statistics be strategically placed on display 266/366 so as to remain visible yet unobtrusive to a user of wearable AR device 160a-160c/260A/260B/360 despite movement by the user. Rendering of AR enhancement effect(s) 134/334/534 on display 266/366 of wearable AR device 160a-160c/260A/ 260B/360 during event 154/554 may be performed by AR effect generation software code 320b/520, executed by hardware processor 274/374 of wearable AR device 160a-160c/ 260A/260B/360.

Thus, the present application discloses systems and methods for providing event enhancement using AR effects. By receiving venue description data corresponding to an event venue and identifying the event venue based on the venue description data, the present event enhancement solution enables a determination of viewing angle characteristics specific to the event venue and the particular seat occupied by an attendee to an event at that event venue. In addition, by identifying the event scheduled to take place at the event venue, the present event enhancement solution enables the generation of AR effects based on the event and the event venue. The present solution further outputs those AR enhancement effects for rendering on a display of a wearable AR device, thereby enhancing the experience of the attendee to the event when wearing the AR device.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a hardware processor and a memory storing an augmented reality (AR) effect generation software code;
   wherein the hardware processor is configured to execute the AR effect generation software code to:
   receive a venue description data corresponding to an event venue;
   identify the event venue based on the venue description data;
   identify an event scheduled to take place at the event venue;
   generate at least one AR enhancement effect based on the event and the event venue;
   output the at least one AR enhancement effect for rendering on a display of a wearable AR device worn by a user during the event, wherein the at least one AR enhancement effect includes a viewing angle of the event corresponding to a location of the user;
   detect the user moving from the location; and
   in response to detecting the user moving from the location, output the at least one AR enhancement effect locked to the viewing angle for rendering as a picture-in-picture on the display.

2. The system of claim 1, wherein the system is integrated with the wearable AR device, and wherein the hardware processor is further configured to execute the AR effect generation software code to render the at least one AR enhancement effect on the display during the event.

3. The system of claim 1, wherein the wearable AR device comprises one of AR glasses, AR goggles, and an AR headset.

4. The system of claim 1, wherein the venue description data comprises image data obtained at the event venue.

5. The system of claim 1, wherein the hardware processor is further configured to execute the AR effect generation software code to identify a seat in the event venue occupied by the user of the wearable AR device, and wherein the location of the user is a location of the seat.

6. The system of claim 5, wherein detecting the user moving from the location includes detecting the user moving away from the seat.

7. The system of claim 5, wherein the hardware processor is further configured to execute the AR effect generation software code to detect relocation of the user to another seat in the venue, and wherein the at least one AR enhancement effect for the event comprises displaying another viewing angle of the event corresponding to a location of the another seat.

8. The system of claim 1, wherein the at least one AR enhancement effect includes metadata specifying a location on the display for placement of the AR enhancement effect.

9. The system of claim 1, wherein the at least one AR enhancement effect comprises subtitles for the event.

10. The system of claim 1, wherein the at least one AR enhancement effect is one of a word bubble, thought bubble, and information bubble corresponding to at least one of an actor, character, musical artist, and athlete performing in the event.

11. A method for use by a system including a computing platform having a hardware processor and a memory storing an augmented reality (AR) effect generation software code, the method comprising:
   receiving, using the hardware processor, a venue description data corresponding to an event venue;
   identifying, using the hardware processor, the event venue based on the venue description data;
   identifying, using the hardware processor, an event scheduled to take place at the event venue;
   generating, using the hardware processor, at least one AR enhancement effect based on the event and the event venue;
   outputting, using the hardware processor, the at least one AR enhancement effect for rendering on a display of a wearable AR device worn by a user during the event, wherein the at least one AR enhancement effect includes a viewing angle of the event corresponding to a location of the user;
   detecting, using the hardware processor, the user moving from the location; and
   in response to detecting the user moving from the location, outputting the at least one AR enhancement effect locked to the viewing angle for rendering as a picture-in-picture on the display.

12. The method of claim 11, wherein the system is integrated with the wearable AR device, and wherein the method further comprises rendering, using the hardware processor, the at least one AR enhancement effect on the display during the event.

13. The method of claim 11, wherein the wearable AR device comprises one of AR glasses, AR goggles, and an AR headset.

14. The method of claim 11, wherein the venue description data comprises image data obtained at the event venue.

15. The method of claim 11, further comprising identifying a seat in the event venue occupied by the user of the wearable AR device, and wherein the location of the user is a location of the seat.

16. The method of claim 15, wherein detecting the user moving from the location includes detecting the user moving away from the seat.

17. The method of claim 15, further comprising detecting relocation of the user to another seat in the venue, and wherein the at least one AR enhancement effect for the event comprises displaying another viewing angle of the event corresponding to a location of the another seat.

18. The method of claim 11, wherein the at least one AR enhancement effect includes metadata specifying a location on the display for placement of the AR enhancement effect.

19. The method of claim 11, wherein the at least one AR enhancement effect comprises subtitles for the event.

20. The method of claim 11, wherein the at least one AR enhancement effect is one of a word bubble, thought bubble, and information bubble corresponding to at least one of an actor, character, musical artist, and athlete performing in the event.

* * * * *